B. C. SILVER.
CHILD'S VEHICLE.
APPLICATION FILED MAY 11, 1918.
1,310,218.
Patented July 15, 1919.
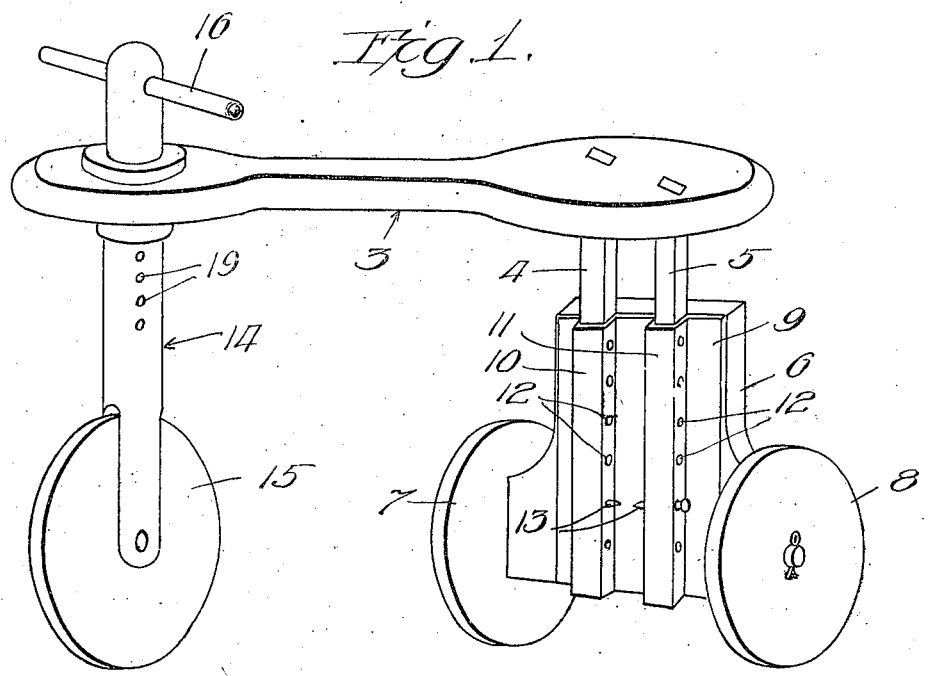
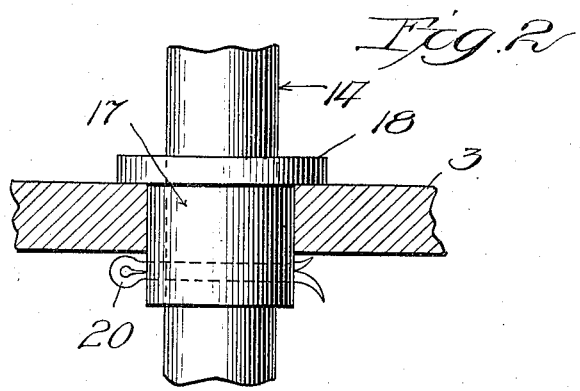
Inventor
Bennett Coleman Silver
by
Attys

UNITED STATES PATENT OFFICE.

BENNETT COLEMAN SILVER, OF CHICAGO, ILLINOIS.

CHILD'S VEHICLE.

1,310,218.  Specification of Letters Patent.  Patented July 15, 1919.

Application filed May 11, 1918. Serial No. 233,842.

*To all whom it may concern:*

Be it known that I, BENNETT COLEMAN SILVER, a citizen of the United States, residing at Chicago, in the county of Cook and State of Illinois, have invented certain new and useful Improvements in Children's Vehicles, of which the following is a specification.

The present invention has to do with improvements in children's vehicles such as are popularly known by the name of Kiddiekars. These little vehicles are provided with front and rear wheels in combination with an intermediate platform which the child straddles, advancing the car by working his feet on the sidewalk.

The main object of the present invention is to provide a device of this construction, the elevation of which can be readily adjusted according to the size of the child, so that the same toy may be used for a very much longer period of time during the child's growth.

Another object in this connection is to provide a construction of great simplicity and which can be cheaply manufactured from standardized parts.

Other objects and uses of the invention will appear from a detailed description of the same which consists in the features of construction and combinations of parts hereinafter described and claimed.

In the drawing:

Figure 1 shows a perspective view of a vehicle embodying the features of the present invention; and Fig. 2 is a fragmentary detail vertical section through the adjustment bearing for the steering post.

The platform of the car is designated in its entirety by the numeral 3. At its rear end it is provided with a pair of vertically downwardly extending posts 4 and 5, the upper ends of which are rigidly attached to the platform.

A rear truck block 6 has the rear wheels 7 and 8 journaled to its lower portions. A sheet metal plate 9 which is formed with vertical channels 10 and 11 is rigidly secured to this truck block 6, the channels 10 and 11 being properly spaced and of suitable size to accommodate the posts 4 and 5 respectively. The posts may be slid up and down in the spaces between the channels and the truck block for purposes of vertical adjustment of the rear end of the platform 3. Each of the channels is provided with a row of perforations 12, and each of the posts 4 and 5 is provided with one or more perforations, so that the posts may be secured in any vertically adjusted position by passing pins 13 through the proper perforations of the channels and posts.

The front portion of the platform is supported by a steering post 14, the lower end of which is forked or bifurcated to accommodate the front wheel 15. The steering post extends up through the front portion of the platform and carries a handle bar 16 on its upper end, which handle bar serves not only as a hand grip for the child, but also serves as a means for turning the steering post for the steering function. A thimble 17 passes through an opening in the platform and serves as a bushing between the steering post and the platform. The upper portion of this thimble is provided with a flange or collar 18, and the lower portion of the thimble is provided with a pair of opposed perforations. Similar perforations 19 are provided in the steering post, so that upon setting the front portion of the platform to the desired elevation a pin 20 may be passed through the perforations of the thimble and the selected perforation of the steering post to thereby lock the thimble to the steering post at the desired elevation. The pin 20 will also serve as a support for the platform, so that the latter is held at the proper elevation. The pin 20 may be a cotter pin such as illustrated, or any other suitable type.

I claim:

1. A child's vehicle comprising, in combination, a platform, a pair of downwardly extending vertical posts immovably secured to its rear portion, a truck block, wheels journaled to the lower portion thereof, a channel plate secured to one face of the truck block and having channels suitably spaced and sized to accommodate the posts aforesaid, there being perforations in the channels and in the posts for the accommodation of pins for the purpose specified, a steering post in the front portion of the device, a front wheel journaled therein, means for turning said steering post, and means permitting vertical adjustment of the front portion of the platform with respect to the front wheel, substantially as described.

2. A child's vehicle comprising, in combination, a platform, a pair of posts immovably secured to and downwardly extending from the rear portion of said platform, a truck block, a pair of wheels journaled thereon, there being vertical passages in relation to the truck block for the accommodation of said posts, pins for securing the posts at a selected elevation with respect to the truck block, a steering post in the front portion of the device, a wheel journaled to the lower end thereof, substantially as described.

BENNETT COLEMAN SILVER.

Copies of this patent may be obtained for five cents each, by addressing the "Commissioner of Patents, Washington, D. C."